(12) United States Patent
Idicula et al.

(10) Patent No.: US 7,533,136 B2
(45) Date of Patent: May 12, 2009

(54) EFFICIENT IMPLEMENTATION OF MULTIPLE WORK AREAS IN A FILE SYSTEM LIKE REPOSITORY THAT SUPPORTS FILE VERSIONING

(75) Inventors: Sam Idicula, San Jose, CA (US); Thomas Baby, Foster City, CA (US); Vikram Kapoor, Sunnyvale, CA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 11/316,777

(22) Filed: Dec. 22, 2005

(65) Prior Publication Data

US 2007/0156687 A1   Jul. 5, 2007

(51) Int. Cl.
  *G06F 17/30*  (2006.01)
(52) U.S. Cl. .......................... 707/203; 707/8
(58) Field of Classification Search ................. 707/203
  See application file for complete search history.

(56) References Cited

U.S. PATENT DOCUMENTS

| | | | | |
|---|---|---|---|---|
| 4,439,837 | A | | 3/1984 | Aiena et al. ................. 364/900 |
| 4,536,873 | A | | 8/1985 | Leete ............................ 370/85 |
| 5,088,032 | A | | 2/1992 | Bosack ........................ 395/200 |
| 5,313,646 | A | * | 5/1994 | Hendricks et al. ........... 707/101 |
| 5,678,040 | A | * | 10/1997 | Vasudevan et al. ............. 707/8 |
| 5,706,510 | A | * | 1/1998 | Burgoon ..................... 707/203 |
| 5,734,899 | A | | 3/1998 | Yoshizawa et al. .......... 395/619 |
| 6,085,188 | A | | 7/2000 | Bachmann et al. ............. 707/3 |
| 6,279,007 | B1 | | 8/2001 | Uppala ....................... 707/101 |
| 6,427,123 | B1 | * | 7/2002 | Sedlar ........................... 702/2 |
| 6,460,052 | B1 | | 10/2002 | Thomas et al. .............. 707/203 |
| 6,587,854 | B1 | | 7/2003 | Guthrie et al. | |
| 6,631,386 | B1 | | 10/2003 | Arun et al. ................... 707/203 |
| 6,785,769 | B1 | * | 8/2004 | Jacobs et al. ................. 711/118 |
| 6,959,416 | B2 | | 10/2005 | Manning et al. ............. 707/100 |
| 7,117,216 | B2 | | 10/2006 | Chakraborty et al. ....... 707/100 |

(Continued)

OTHER PUBLICATIONS

Geoff Lee, "Oracle Database 10g Release 2 XML DB Technical Overview" An Oracle White Paper, May 2005, 28 pages, Oracle Corporation, Redwood Shores, California.

(Continued)

*Primary Examiner*—Mohammad Ali
*Assistant Examiner*—Syed Haroon Hasan
(74) *Attorney, Agent, or Firm*—Hickman Palermo Truong & Becker LLP (57) ABSTRACT

A shared workspace is associated with a group of users who share the workspace, which isolates a set of shared resources from other resources stored in a repository that supports versioning of resources. The content of a shared workspace is maintained using a set of shared references, to the set of resources associated with the shared workspace. A virtual workspace is created for a user by generating a personal mapping for the user, where the personal mapping indicates which resources from the set of shared resources the user has made personal, e.g., by checking out such resources from the repository. If the user submits a query on the repository, the particular version of each resource involved in the query is readily determinable from the shared workspace and the user's virtual workspace.

28 Claims, 4 Drawing Sheets

U.S. PATENT DOCUMENTS

| | | | |
|---|---|---|---|
| 7,139,746 B2 | 11/2006 | Shin et al. ................... 707/2 |
| 7,287,033 B2 | 10/2007 | Shadmon et al. |
| 2002/0143906 A1* | 10/2002 | Tormasov et al. ........... 709/220 |
| 2002/0147634 A1 | 10/2002 | Jacoby et al. |
| 2004/0088306 A1* | 5/2004 | Murthy et al. .............. 707/100 |
| 2004/0205082 A1 | 10/2004 | Fontoura et al. ............ 707/101 |
| 2004/0220912 A1* | 11/2004 | Manikutty et al. ............. 707/3 |
| 2005/0091188 A1 | 4/2005 | Pal et al. ...................... 707/1 |
| 2005/0097084 A1 | 5/2005 | Balmin et al. ................. 707/2 |
| 2005/0144198 A1 | 6/2005 | Bergstraesser et al. |
| 2006/0271606 A1 | 11/2006 | Tewksbary |
| 2006/0288056 A1 | 12/2006 | Yamakawa et al. .......... 707/203 |
| 2007/0043715 A1 | 2/2007 | Kaushik et al. ................ 707/4 |
| 2007/0118561 A1 | 5/2007 | Idicula et al. ............... 707/104 |

OTHER PUBLICATIONS

Mark Drake, "Oracle Database 10g Release 2 XML DB" An Oracle Technical White Paper, May 2005, 97 pages, Oracle Corporation, Redwood Shores, California.

Mark D. Drake, "Oracle Database 10g Release 2 XML DB & XML DB Repository" Oracle Data Sheet, May 2005, 6 pages, Oracle Corporation, Redwood Shores, California.

"Managing Content with Oracle XML DB", An Oracle White Paper, Mar. 2005, 38 pages, Redwood Shores, California.

Geoff Lee et al., "Mastering XML DB Storage in Oracle Database 10g Release 2" An Oracle White Paper, Mar. 2005, 15 pages, Oracle Corporation, Redwood Shores, California.

Geoff Lee, "Mastering XML DB Repository in Oracle Database 10g Release 2" An Oracle White Paper, Mar. 2005, 15 pages, Redwood Shores, California.

Sean Dillon, "Getting to XML", Oracle Magazine, May/Jun. 2005, 3 pages.

Oracle XML DB Developer's Guide 10g Release 2 (10.2) B14259-02, Aug. 2005, 24 pages.

"Oracle 9i Database Daily Feature", Oracle Technology Network, Jun. 2005, 3 pages.

Bill Beauregard, "Oracle Database 10g Workspace Manager Support for Oracle Spatial Topology Data Model", An Oracle White Paper, May 2005, 7 pages.

Bill Beauregard, "Oracle Database 10g Workspace Manager Overview" An Oracle White Paper, May 2005, 13 pages, Redwood Shores, California.

Bill Beauregard, "Using Oracle Workspace Manager to Cut Costs: Case Studies", Dec. 2003, 36 pages.

"IETF WEBDAV Working Group World Wide Web Distributed Authoring and Versioning" retrieved on Feb. 22, 2006 from the Internet <URL: http:/ftp.ics.uci.edu/pub/ietf/webdav/> 6 pages.

"Versioning Extensions to WebDAV (Web Distributed Authoring and Versioning)" retrieved on Feb. 22, 2006 from the Internet <URL: http://www.webdav.org/deltav/protocol/rfc3253.html> (110 pages).

"Versioning Extensions to WebDAV (Web Distributed Authoring and Versioning)" retrieved on Feb. 27, 2006 from the Internet <URL: http://www.webdav.org/deltav/protocol/rfc3253.html> (112 pages).

"*WVCM: The Workspace Versioning and Configuration Management API*" retrieved on Feb. 27, 2006 from the Internet <URL: http://www.webdav.org/deltav/wvcm/wvcm-overview.html> (16 pages).

Chou, H. et al., "A Unifying Framework for Version Control in a CAD Environment" Aug. 1986 (pp. 336-344).

* cited by examiner

RESOURCE TABLE 102

| RES_ID | VHID | CONTENT |
|---|---|---|
| 001 | F1 | ... |
| 002 | F2 | ... |
| 003 | F3 | ... |
| 004 | F1 | ... |
| 005 | F2 | ... |
| ... | ... | ... |
| 00n | Fn | ... |

(FILE F1, VER. 1)
(FILE F2, VER. 1)
(FILE F3, VER. 1)
(FILE F1, VER. 2)
(FILE F2, VER. 2)

PERSONAL VHID BIT VECTOR 104

| 1 | 1 | 0 | ... | 0 |
|---|---|---|---|---|
| F1 | F2 | F3 | | Fn |

VHID

PERSONAL MAPPING 106

| VHID | RES_ID |
|---|---|
| F1 | 004 |
| F2 | 005 |

PERSONAL BIT VECTOR 108

| 0 | 0 | 0 | 1 | 1 | ... | 0 |
|---|---|---|---|---|---|---|
| 001 | 002 | 003 | 004 | 005 | | 00n |

RES_ID

EFFICIENT IMPLEMENTATION OF MULTIPLE WORK AREAS IN A FILE SYSTEM LIKE REPOSITORY THAT SUPPORTS FILE VERSIONING

FIELD OF THE INVENTION

The present invention relates generally to data management and, more specifically, to implementing and using multiple work areas in the context of a file system-like repository that supports file versioning.

BACKGROUND

A database may provide a file repository that can be accessed via a variety of file system-based interfaces, such as those utilizing HTTP/WebDAV (Web Distributed Authoring and Versioning) or NFS (Network File System). Through such interfaces to the repository, a file is located, for example, via its URL or path and the repository is exposed as a hierarchical set of files and folders (e.g., directories). Further, data-oriented access mechanisms can be used to access a file repository, which expose the repository as a flat set of files that can be queried based on file content or attributes.

Files can be versioned, for example, in order to keep a record of changes to files, to provide the option to revert to an older version of a file, and to get information on who made each change to a file and the progression of changes to the file. When several users are working collaboratively on a set of files organized in a folder hierarchy, the users need to be isolated from each other's in-progress changes. For example, user U1 may be working on a project that needs to change files f1 and f2, and user U2 may need to use these files while working on another project. However, until U1 has completed changes to f1 and f2, U2 should see only the older versions of both files. Thus, a versioned repository allows users to check-out files, possibly update the files, and check the files in once the updates are completed. In this scenario, U2 does not want to see U1's checked-out versions of files.

In some scenarios, it may also be necessary for U1's changes to go through an approval/testing process after check-in to the repository. Other users should be isolated from even checked-in versions until these versions are approved. In such scenarios, there is usually an application that is involved in marking files as approved or tested to indicate that these file versions can be exposed to all users.

Traditional versioning systems provide isolation using workspaces, an abstraction used to identify and maintain separate folder hierarchies for different users so that multiple users can work in isolation on a set of resources, where the term "resource" is generally used herein to include a file. An extension to WebDAV, referred to as "DeltaV," is a network protocol that provides facilities for remote versioning and configuration management of documents stored on Web servers, which often interface with a file system-like repository for content management purposes. DeltaV is described in "DeltaV: Adding Versioning to the Web; WWW10 Tutorial Notes" (referred to herein as "the DeltaV reference") available from the WebDAV.org organization; the entire contents of which is incorporated by this reference for all purposes as if fully disclosed herein.

As described in the DeltaV reference, a workspace is created by creating a separate version-controlled resource for each workspace. Thus, a workspace is essentially a copy of a set of resources in which a user can work in isolation from other users, where users' interactions are in the form of branches in the version history. Use of traditional workspaces provides a high degree of isolation, but has associated overhead costs associated with duplicative directories. Further, use of traditional workspaces does not provide for readily sharing versions that need to be exposed to all users. For example, when a file is checked out from the repository, modified, and checked back into the repository, a reference in every user workspace that includes that file needs to be changed. Hence, there is a need for separate work areas for users to provide necessary isolation, without incurring the overhead of separate, and often duplicative, folder hierarchies and the overhead associated with changing a large number of user workspace references.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

In the context of user workspaces, a shared workspace is associated with a group of users who share the workspace. For example, a shared workspace may be created to isolate a set of shared resources (e.g., files organized in a hierarchical directory structure) for a particular project from other resources stored in a repository that supports versioning of resources. The content of a shared workspace is maintained using a set of shared references, such as disk pointers, to the set of resources associated with, or "in", the shared workspace. This shared workspace functions as a baseline workspace for all users in the group. In the context of a "virtual workspace," this shared workspace is referred to as the "real workspace" for the group of users.

A virtual workspace is created by generating a personal mapping for a user, where the personal mapping indicates which resources from the set of resources that the user, depending on the implementation, has (a) checked out from the repository (i.e., checked out from the real workspace)

and/or (b) checked out from the repository and subsequently modified and/or (c) modified and checked back into the repository and while still awaiting some form of formal approval. Effectively, this mapping changes the user's reference to that particular resource from the shared reference, which points to the stored shared version of the resource, to a personal reference, which points to the personal version of the resource that the user has checked out. Hence, if the user submits a query on the repository, the version of each resource involved in the query is readily determinable from the shared real workspace and the user's virtual workspace. That is, using the user's personal mapping in conjunction with the set of shared references, a server or other application that is servicing the query can determine exactly which versions of each resource are in the user's personal workspace.

According to one embodiment, the personal mapping is implemented using a personal mapping table with an entry for each of the resources that the user has checked out from the versioned repository. For example, entries in the mapping table may be created when the user checks out the shared version of the resource, or when the user actually modifies and/or locally saves the copied version of the resource. According to a related embodiment, each entry in the personal mapping table relates a resource identifier (which may be referred to as a "version history identifier"), which is the same for every version of a particular resource, with a resource version identifier, which identifies a particular version of the particular resource. For example, the resource identifier may be implemented as the row identifier (e.g., row_id) of a row of a database table (e.g., the "resource table") in which all versions of the workspace resources are stored.

According to one embodiment, the personal mapping is implemented using a bit vector that is indexed by resource identifier values. For each resource for which the user has checked out a copy from the repository, a corresponding bit is set in the bit vector. Thus, in response to a query on the resource table, the resource version identifiers that correspond to rows that match the query can be determined, and whether or not these rows are in the user's workspace can be readily determined from the user's personal bit vector.

Operating Environment—Storage System

The techniques described herein may be implemented in the context of a database system and, according to one embodiment, are implemented in a database repository that supports versioning of hierarchically organized resources such as a file system-like repository. A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner. Such a repository is at times referred to as an XML repository or an XML database (i.e., "XDB").

Virtual Workspaces

Virtual workspaces are provided based on a single real workspace. According to one embodiment, one virtual workspace is created per user. As discussed, a real workspace is one that has its own folder hierarchy representing actual storage of folders in a versioned repository. Virtual workspaces appear to be separate folder hierarchies in the repository file system, but are based on a real workspace. However, virtual workspaces do not have their own physical sub-folders on the server. Although virtual workspaces share the hierarchy with the real workspace, they may point to different versions of certain files in the hierarchy.

According to one embodiment, when a user checks out a resource (e.g., a file) from a shared repository into a virtual workspace VW1, that workspace now points to the checked-out version of the resource. Effectively, other virtual workspaces continue to point to the previous version of the file, as determined by the real workspace. Once the user checks in the file, the real workspace also points to the new, checked-in version. Hence, the other virtual workspaces now also see the new version.

In scenarios in which there is an approval/testing process associated with checking in a resource before the checked-in version of the resource is visible to others, the checked-in version of the resource remains private to VW1 for some time even after it is checked-in by the user, i.e., the real workspace continues to point to the previous version. Once the checked-in version of the resource is approved, the real workspace is changed to point to the new version, thus making it visible to all other virtual workspaces.

According to one embodiment, when a new file is created in a workspace (e.g., VW1), the new file is created in the real workspace's folder, but marked as personal, thereby restricting the new file to VW1. Similarly, when a file is deleted in VW1, the file is not deleted from the real workspace's folder, thus making it visible to all other virtual workspaces. However, the deleted file is tracked as deleted in VW1's personal mapping.

Typically the number of personal files is very small compared to the total number of files in the repository. Each virtual workspace does not need separate storage of folders on the server. When a file needs to be made visible to all other workspaces, only the real workspace's folder needs to be modified, as opposed to modifying each user's virtual workspace. Hence, the techniques described herein can scale to a large number of virtual workspaces.

Figure 1:
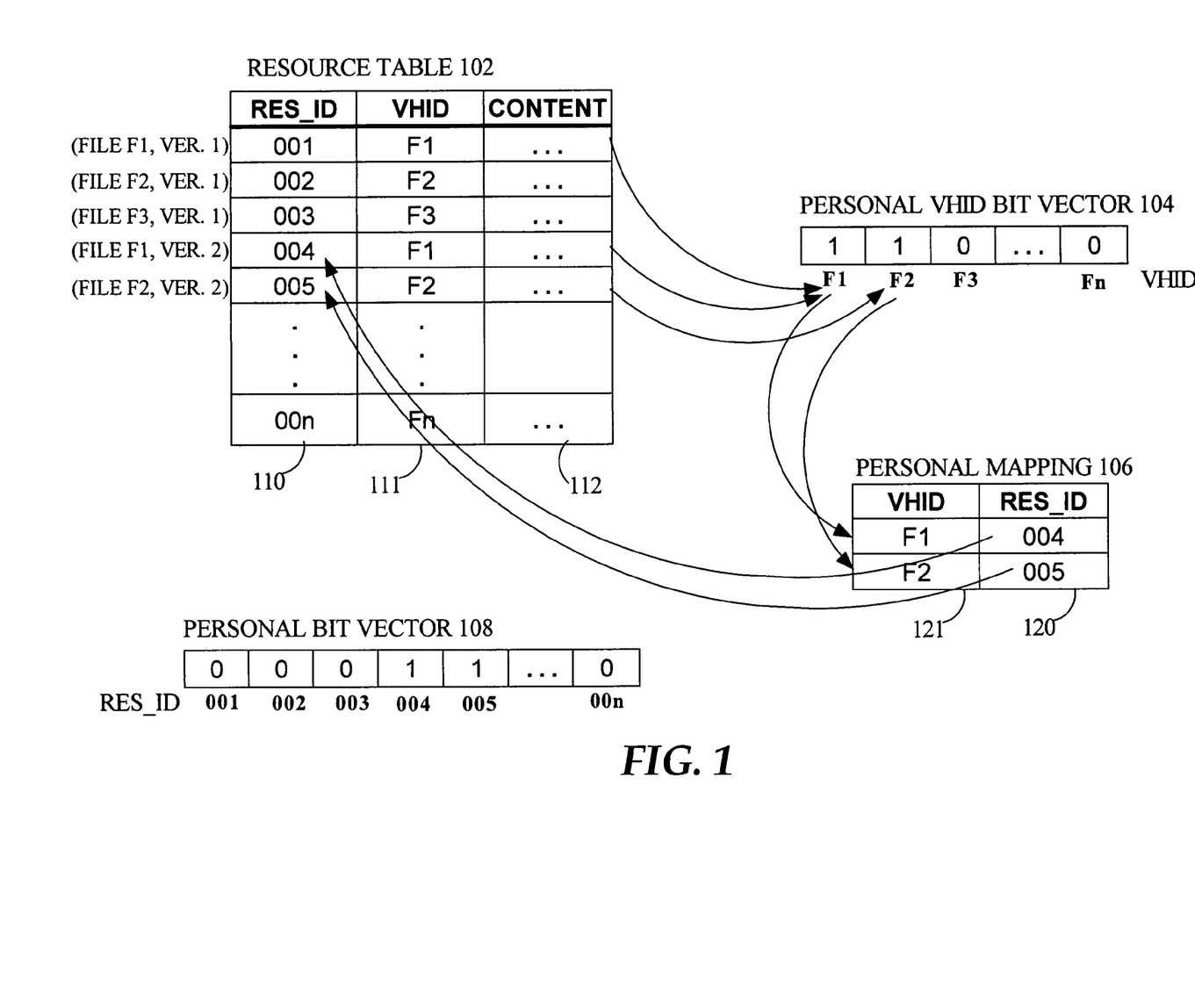
FIG. 1 is a block diagram illustrating interactions between virtual workspace data structures, according to an embodiment of the invention.

FIG. 1 is a block diagram illustrating interactions between virtual workspace data structures, according to an embodiment of the invention. Illustrated in FIG. 1 are a resource table 102, a personal VHID bit vector 104, a personal mapping 106, and a personal bit vector 108, all of which are data structures in a database system.

Resource Table

Resource table 102 is a data table that stores resources (e.g., contents of files stored in a repository component of the database) representing all versions of all files that are stored in the repository. Thus, resource table 102 effectively stores, at any point in time, past and current versions of resources associated with the real shared workspace as well as current versions of the resources associated with virtual workspaces for users who are associated with the real workspace. Furthermore, resource table 102 may store versions of resources associated with multiple real shared workspaces as well as user virtual workspaces, e.g., store all versions of all resources in the repository.

The schema of resource table 102 may vary from implementation to implementation, but is depicted in FIG. 1 comprising columns for resource identifiers ('res_id') 110, version history identifiers ('VHID') 111, and the content 112 of the respective versions of the resources. All versions of a given resource are associated with the same unique version history identifier. For example, both version 1 and version 2 of file F1 have a VHID=F1; both version 1 and version 2 of file F2 have a VHID=F2; version 1 of file F3 has a VHID=F3; and so on. Each version of a given resource is also associated with a unique resource version identifier. For example, version 1 of file F1 has a res_id=001; version 1 of file F2 has a res_id=002; version 1 of file F3 has a res_id=003; version 2 of file F1 has a res_id=004; version 2 of file F2 has a res_id=005; and so on. Further, the content of each version of each resource may be stored in resource table 102, as depicted, or in a separate table.

Personal Mapping

According to one embodiment, a virtual workspace for a given user is created by creating a personal mapping 106. Personal mapping 106 is a mapping between version history identifiers ('VHID') 121 and resource version identifiers ('res_id') 120 for each file that the user has in the user's personal virtual workspace. For example, in addition to associating a user with a shared workspace, an empty personal mapping 106 table may be created for the user when a user configuration is created for the user, such as when the user is added as a user of the repository or of the database system. Entries in personal mapping 106 provide location information for locating in the resource table 102 (e.g., locating on persistent storage) the versions of resources that are personal to the user, i.e., versions of resources that are in the user's personal virtual workspace. This is because the entries in personal mapping 106 include the resource identifiers ('res_id') for the personal versions, which refer back to the resource identifiers in respective rows of resource table 102, which identify, store or otherwise refer to the location in memory of the actual content of the resource version.

As mentioned, depending on the implementation, a resource version may be "personal" to the user if (a) the user copied a shared version of the resource from the repository; (b) the user copied a shared version of the resource from the repository and made changes to the copied version; or (c) the user copied a shared version of the resource from the repository, made changes to the copied version, and checked the changed version back into the repository for approval, which approval has not yet occurred. Furthermore, the exact timing of when an entry is added to the personal mapping 106 may vary from implementation to implementation. For one non-limiting example, an entry may be added to personal mapping 106 in response to the user checking out a resource from the repository, i.e., copying the shared version of the resource from the repository into the user's local memory and, therefore, into the user's personal virtual workspace. For another non-limiting example, an entry may be added to personal mapping 106 in response to the user changing a resource that is checked out from the repository, rather than in response to checking out the resource.

Regardless of when entries in personal mapping 106 are created, according to one embodiment, entries for only the file versions that are personal to the particular user are created in personal mapping 106. Files that are not checked out by the particular user can be located via references associated with the shared workspace, rather than via the references associated with the user's personal virtual workspace. Similarly, in implementations in which formal approval of a file version is required before the file version is visible to other users as a shared resource, files that are checked back in by the particular user and have been approved via the approval process can be located via references associated with the shared workspace, rather than via the references associated with the user's personal virtual workspace. On the other hand, files that are checked back in by the particular user, but have not yet been approved via the approval process, can be located only by the particular user via the references associated with the user's personal virtual workspace.

Personal VHID Bit Vector

Queries of the versioned repository may be in the form of queries on the resource table. For example, such a query may be a database statement constructed in standard SQL. According to one embodiment, another data structure is constructed, a personal VHID bit vector 104, which facilitates efficient execution of queries of the repository via a traditional database query execution engine, e.g., a SQL engine. Personal VHID bit vectors are personal to a user, i.e., each user that checks out a resource from the repository would have an associated unique personal VHID bit vector 104. Personal VHID bit vector 104 is indexed by VHID, so that each bit in the bit vector is associated with a particular VHID and, therefore, associated with a particular resource, or file. Thus, if a bit is set in a particular user's personal VHID bit vector, then that indicates that the user has a personal version of the resource that corresponds to the bit by way of the resource's associated VHID. As depicted in FIG. 1, each of the bits associated with file F1 and file F2 is set, indicating that the user has a personal version of files F1 and F2 in the user's personal virtual workspace, i.e., checked out from the repository. A use of the personal VHID bit vector is described in greater detail hereafter.

Responding to a Query on the Repository

Figure 2A:
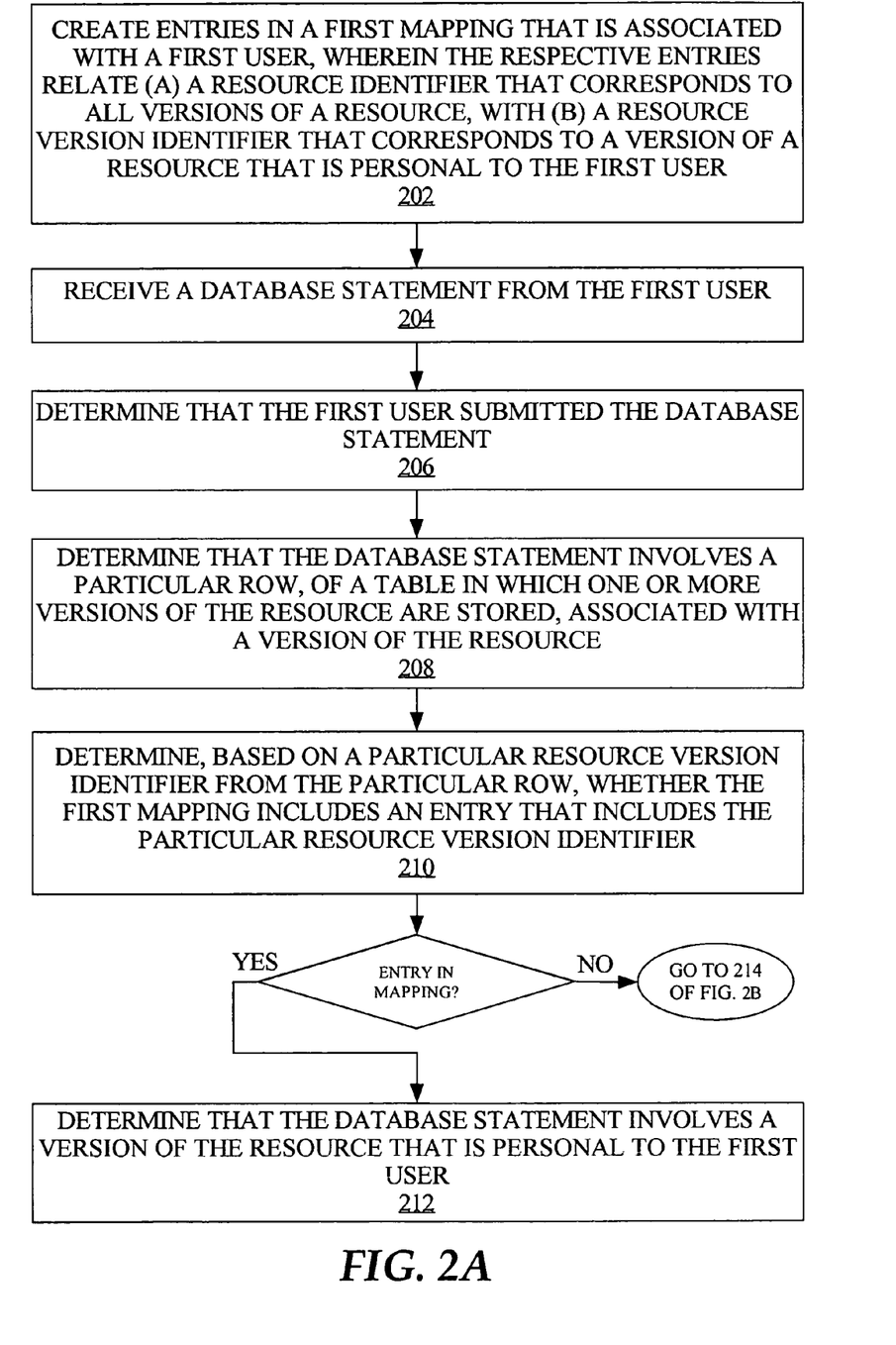
FIG. 2A and FIG. 2B are flow diagrams that illustrate a process involving virtual workspaces associated with users of a repository that supports versioning of resources, according to an embodiment of the invention.
Figure 2B:
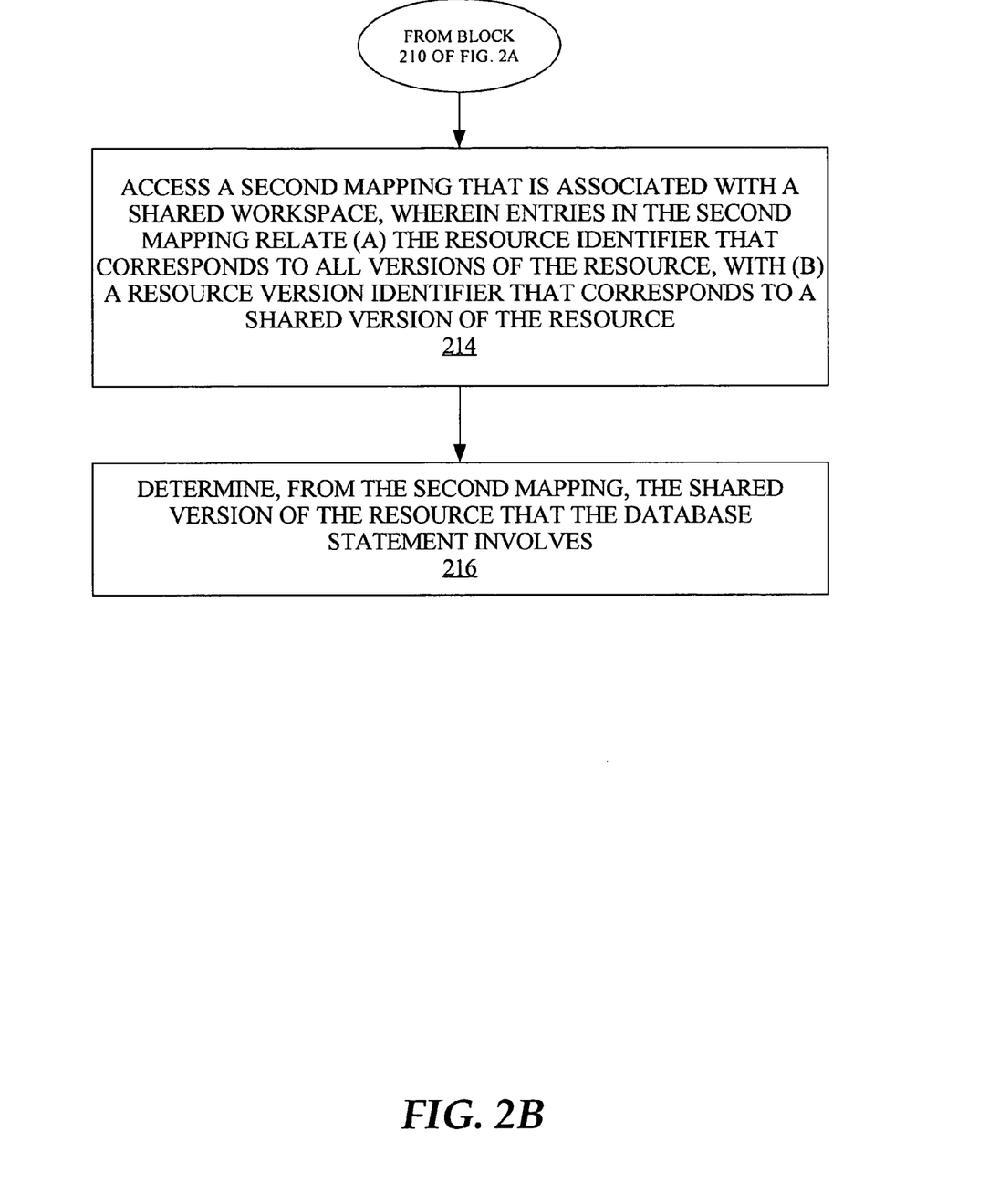

FIG. 2A and FIG. 2B are flow diagrams that illustrate a process involving virtual workspaces associated with users of a repository that supports versioning of resources, according to an embodiment of the invention. The process illustrated in FIGS. 2A and 2B is implemented for automated performance by a conventional computing system, such as computer system 300 of FIG. 3. One possible operating environment in which the process of FIGS. 2A and 2B may be implemented is a database system.

At block 202, entries are created in a first mapping that is associated with a first user. The respective entries in the first mapping relate (a) a resource identifier that corresponds to all versions of a resource, with (b) a resource version identifier that corresponds to a version of the resource that is personal to the first user. For example, an entry is added to the first user's personal mapping 106 (FIG. 1), relating the VHID of a version of a resource that the first user checked out with the res_id that corresponds to the checked out version of the resource in the resource table 102 (FIG. 1). For another example, an entry is added to the first user's personal mapping 106 (FIG. 1), relating the VHID of a version of a resource that the first user checked out with the res_id that corresponds to a modified checked out version of the resource in the resource table 102 (FIG. 1). For yet another example, an entry is added to the first user's personal mapping 106 (FIG. 1), relating the VHID of a version of a resource that the first user checked out with the res_id that corresponds to a modified checked out version of the resource in the resource table 102 (FIG. 1), which was checked back into the repository but not yet formally approved.

At block 204, a database statement is received from the first user. For example, a conventionally structured query is received at a database server. Thus, at block 206, it is determined that it was the first user that submitted the database statement. For example, each database session is associated with a particular user after a corresponding login and authentication process. Hence, based on from which session the database statement was submitted, the database server can determine what user is associated with the session and, therefore, what user submitted the query statement. Furthermore, each session is associated with a particular workspace, either automatically with a default workspace for the user when the session is initiated, or by an explicit user invocation of an API to set the workspace in the current session to override the default workspace for the user. Each workspace is associated with a personal mapping table associated with the user. Hence, all the necessary information is available to determine that the first user submitted the received database statement, at block 206.

At block 208, it is determined that the database statement involves a particular row of a table in which versions of the resource are stored, where the particular row is associated with a version of the resource. For example, the resource table 102 (FIG. 1) is scanned based on the database statement (e.g., based on SQL SELECT and WHERE clauses) and a row is found that satisfies the database statement, e.g., by SQL engine of a database server. The res_id is read from this row, which identifies this particular version of the resource that satisfies the query.

At block 210, based on the particular resource version identifier read from the row, it is determined whether the first mapping includes an entry that includes this particular resource version identifier. For example, assume the row in the resource table 102 (FIG. 1) with res_id=004 satisfies the query. Based on this res_id, the res_id column of the personal mapping 106 (FIG. 1) is read to determine if res_id 004 is present in this personal mapping 106. If at block 210 it is determined that there is an entry, in the first mapping, that includes this particular resource version identifier, then that means that the corresponding resource version is personal to the first user, i.e., the corresponding resource version is in the first user's personal virtual workspace. Thus, at block 212, it is determined that the database statement involves a version of the resource copied by the first user. For example, an entry with res_id=004 is found in the personal mapping 106 and, therefore, it is determined that the version of the resource that is personal to this user is the version that is identified by res_id=004 (e.g., version 2 of file F1) in the resource table 102. Therefore, this version has been identified as satisfying the query and as being in this particular user's personal virtual workspace, so this version or a portion thereof can be returned in response to the database statement.

On the other hand, if at block 210 it is determined that there is not an entry, in the first mapping, that includes this particular resource version identifier, then that means that the corresponding resource version is not personal to the first user. Hence, at block 214 of FIG. 2B, a second mapping is accessed which is associated with a corresponding shared workspace associated with the repository. Entries in the second mapping relate resource identifiers with resource version identifiers that correspond to shared versions of respective resources that are associated with the shared workspace. These resource version identifiers identify the versions of resources in the real workspace with which all the users in a workspace group are associated when the users do not have personal versions of corresponding resources in their respective personal virtual workspaces. From this second mapping, the shared version of the resource that is involved in the database statement is determined, at block 216. That is, if a user does not have a personal version of a resource in the user's personal virtual workspace, then the correct version of that resource for use in association with that user is the version from the shared real workspace.

For example, assume the row in the resource table 102 (FIG. 1) with res_id=003 satisfies the query. Based on this res_id, the res_id column of the personal mapping 106 (FIG. 1) is read to determine if res_id 003 is present in this personal mapping 106. If at block 210 it is determined that there is no entry in the first mapping that includes this particular resource version identifier, then that means that the corresponding resource version is not personal to the first user. For example, an entry with res_id=003 is not found in the personal mapping 106 and, therefore, it is determined that the version of the resource that is currently used for this user is the version that is identified by res_id=003 (e.g., version 1 of file F3) in the resource table 102. Thus, this version has been identified as satisfying the query, as being in the shared real workspace, and as not being in this particular user's personal virtual workspace, so this version or a portion thereof can be returned in response to the database statement. Furthermore, the personal VHID bit vector 104 can be used to do an additional check before the shared real workspace is accessed, e.g., via the second mapping. For example, when an entry corresponding to the particular resource version identifier is not found in the first mapping, the VHID bit vector 104 can be checked to see if any version of the resource is personal to the user's virtual workspace. If a version of the resource is personal to the user's virtual workspace, then there is no need to check the second mapping because, in this scenario, the resource maps to another resource version that is personal to the user's virtual workspace.

A variation to the foregoing approach can be used, as follows, in an implementation in which the personal VHID bit vector 104 is created and used (as depicted in FIG. 1). After scanning resource table 102 and identifying a row that satisfies the database statement, the VHID corresponding to that row is identified and used to rapidly and efficiently index into the personal VHID bit vector 104. The appropriate bit, which is identified using the VHID read from the row, is read to determine whether or not this bit is set. For example, the row with res_id=005 (version 2 of File F2) in resource table 102 is identified as satisfying the database statement, and the corresponding VHID=F2 for that row is identified. This VHID is used to locate the corresponding bit in personal VHID bit vector 104, from which it is determined that this bit is set. This means that the user has a personal version of file F2 in the user's personal virtual workspace. From the personal mapping 106, it is determined that the personal version of file F2 in the user's personal virtual workspace is identified in the resource table 102 by the res_id=005.

Similarly, if the row with res_id=002 (version 1 of File F2) in resource table 102 is identified as satisfying the database statement, and the corresponding VHID=F2 for that row is identified, then this VHID is used to locate the corresponding bit in personal VHID bit vector 104, from which it is determined that this bit is set. This means that the user has a personal version of file F2 in the user's personal virtual workspace. However, from the personal mapping 106 it is determined that the personal version of file F2 in the user's personal virtual workspace is identified in the resource table 102 by the res_id=005 rather than res_id=002. Therefore, the corresponding version of the resource that satisfies the database statement (version 1 of file F2) is not the version that is personal to this user, so this version is not returned in response to the query.

Use of the personal VHID bit vector 104 provides an approach to quickly determine whether or not a user has a personal version of a particular resource, without needing to access and scan the personal mapping 106 table unless it is determined from the bit vector that the user does have a personal version of the resource in the user's virtual workspace. Furthermore, the VHID bit vector 104 is a more compressed data structure than the mapping table 106 and the VHID is a coarser discriminator than the res_id, so that using the bit vector is typically a more efficient mechanism for determining what resources are in a user's virtual workspace than scanning the mapping table for every pertinent row identified in the resource table 102.

Those skilled in the art will appreciate that use of data structures such as those depicted in FIG. 1 do not require performing the steps depicted in FIGS. 2A and 2B in the exact order depicted. For example, one could scan and traverse from each row in a resource table 102 to a personal VHID bit vector 104 and/or personal mapping 106 for each row scanned, thereby first determining whether the version of the resource associated with the row is in the user's virtual workspace before then determining whether the row actually satisfies the other clauses of the database statement.

Personal Mapping Bit Vector

In the context of the database and the repository views that provide SQL access to the repository, there is a need to quickly check if a given row corresponding to a file version, such as in resource table 106, is present in real and virtual workspaces. Thus, according to one embodiment, an optimized personal mapping is implemented in the form of a personal mapping bit vector. A personal bit vector 108 (FIG. 1), with each position corresponding to a row, is maintained in or associated with respective real and virtual workspaces. For example, if the bit is 1, the file is present in the corresponding workspace; if the bit is 0, the file is not present in the corresponding workspace.

As discussed, for virtual workspaces only delta bit vectors are maintained, i.e., only for rows/versions that are personal to the workspace. These bit vectors (especially the ones for virtual workspaces) are sparse and can be highly compressed. Since a user session typically works within a single workspace, the personal mapping 106 can be read and cached as a hash table in the session. Similarly, the personal bit vector 108, or frequently accessed portions of personal bit vector 108, can also be cached to provide better query support.

Use of the personal bit vector 108 is similar to that of personal mapping 106, as described in reference to blocks 208-214 FIGS. 2A and 2B. For example, upon determining that the database statement involves a particular row of a table in which versions of the resource are stored, where the particular row is associated with a version of the resource, the resource version identifier is read from the row. For example, the resource table 102 (FIG. 1) is scanned based on the database statement and a row is found that satisfies the database statement. The res_id is read from this row, which identifies this particular version of the resource that satisfies the query. Then, based on the particular resource version identifier read from the row, it is determined whether or not the bit that corresponds to that particular version identifier in personal bit vector 108 is set. For example, assume the row in the resource table 102 (FIG. 1) with res_id=004 satisfies the query. Based on this res_id, the corresponding bit of the personal bit vector 108 is read to determine if res_id 004 is set. If this bit is set, then that means that the corresponding resource version is personal to this user, i.e., the corresponding resource version is in the first user's personal virtual workspace by way of copying the shared version of the same resource from the repository. Thus, this version has been identified as satisfying the query and as being in this particular user's personal virtual workspace, so this version or a portion thereof can be returned in response to the database statement.

On the other hand, if it is determined that this bit is not set, then that means that the corresponding resource version is not personal to the first user. Hence, a shared workspace bit vector is accessed which is associated with a corresponding shared workspace associated with the repository. Bits in the second mapping indicate which versions of respective resources are associated with the shared workspace, with which all the users in a workspace group are associated when the users do not have personal versions of corresponding resources in their respective personal virtual workspaces. From this shared workspace bit vector, the shared version of the resource that is involved in the database statement is determined. That is, if a user does not have a personal version of a resource in the user's personal virtual workspace, then the correct version of that resource for use in association with that user is the version from the shared real workspace. As mentioned, the personal VHID bit vector 104 can be used to do an additional check before the shared real workspace is accessed, e.g., via the second mapping. For example, when an entry corresponding to the particular resource version identifier is not found in the first mapping, the VHID bit vector 104 can be checked to see if any version of the resource is personal to the user's virtual workspace and, if so, then there is no need to check the second mapping.

Hardware Overview

Figure 3:
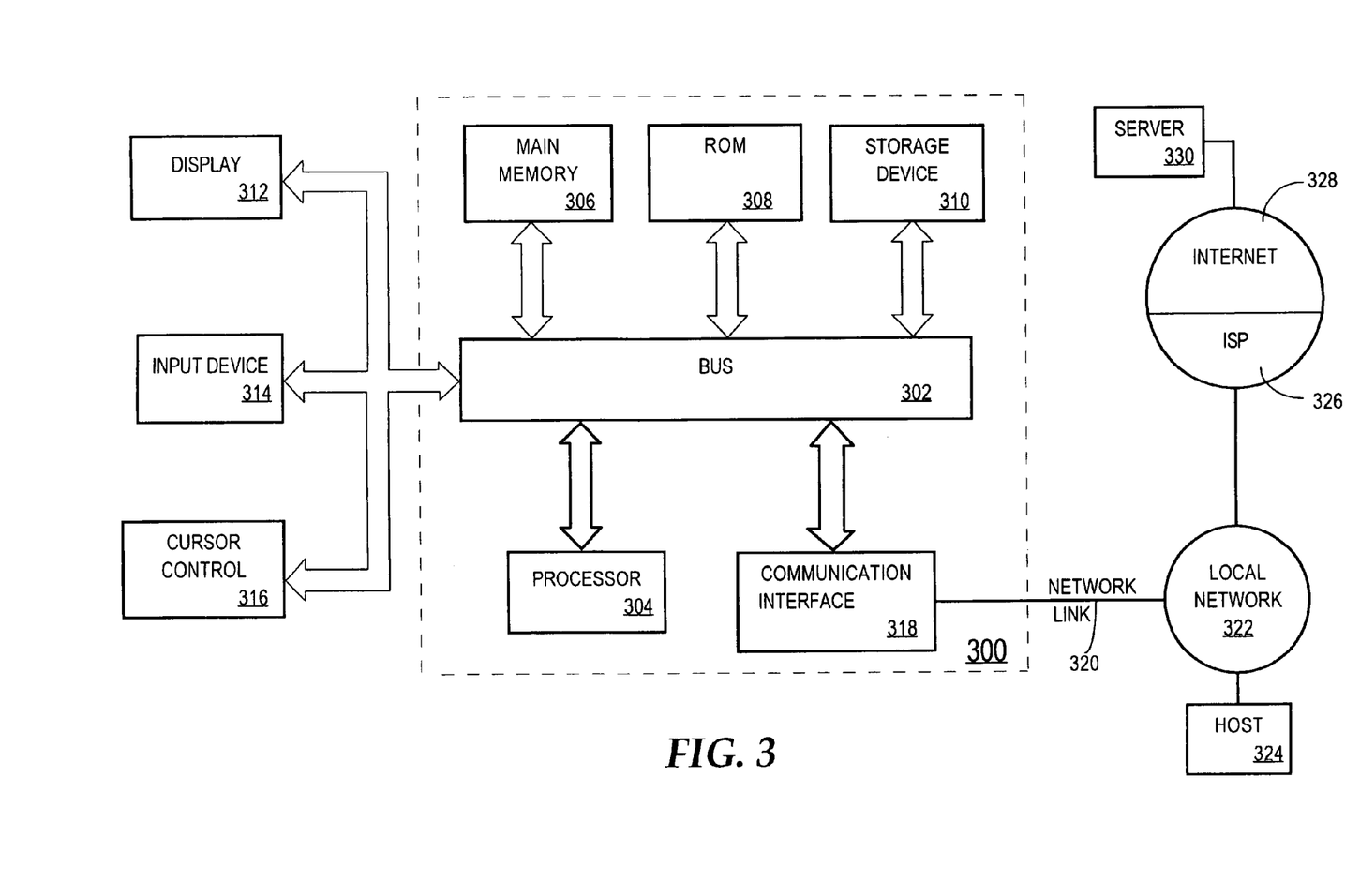
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed on one or more computing devices, wherein the method involves virtual workspaces associated with users of a repository that supports versioning of a plurality of resources, the method comprising the steps of:
   storing and maintaining, in a shared workspace, a first reference that establishes a relationship between (a) a shared version of a resource and (b) the shared workspace, wherein the resource is one of the plurality of resources;
   maintaining, for the shared workspace, a hierarchical folder structure that represents actual storage of folders in the repository without maintaining, for any virtual workspace of the plurality of virtual workspaces, a copy of the hierarchical folder structure;
   wherein the plurality of virtual workspaces includes a first virtual workspace and a second virtual workspace;
   allowing only a first user, of a plurality of users, access to the first virtual workspace; allowing only a second user, of the plurality of users, access to the second virtual workspace;
   wherein a first mapping belongs only to the first virtual workspace;
   wherein a second mapping belongs only to the second virtual workspace;
   in response to input from the first user, making personal the shared version of the resource;
   in response to making personal the shared version of the resource, creating and storing, in the first virtual workspace, a second reference that establishes a relationship between (c) the version of the resource that is personal to the first user and (d) the first virtual workspace, while continuing to maintain the first reference that establishes the relationship between the shared version of the resource and the shared workspace;
   wherein creating and storing the second reference includes creating an entry in the first mapping; wherein the entry includes information that identifies a resource version identifier that corresponds to the version of the resource that is personal to first user; wherein the version of the resource that is personal to the first user is a personal version; wherein the personal version is only accessible to the first user while the personal version is personal to the first user;
   continuing to maintain, for the shared workspace, the hierarchical folder structure without maintaining, for any virtual workspace of the plurality of virtual workspaces, a copy of the hierarchical folder structure.

2. The method of claim 1, wherein the first user makes personal the shared version of the resource by copying, from the repository to the first virtual workspace, the shared version of the resource.

3. A machine-readable storage medium storing instructions which, when executed by one or more processors, cause the one or more processors to perform the steps of claim 2.

4. The method of claim 1, further comprising the steps of:
   in response to the first user saving to the repository a modified version of the resource that is personal to the first user,
      storing, in the shared workspace, a reference that establishes a relationship between the modified version of the resource saved to the repository and the shared workspace.

5. A machine-readable storage medium storing instructions which, when executed by one or more processors, cause the one or more processors to perform the steps of claim 4.

6. The method of claim 1, further comprising the steps of:
   in response to the first user saving to the repository a modified version of the resource that is personal to the first user and to approval of the modified version of the resource that is personal to the first user,
      storing, in the shared workspace, a reference that establishes a relationship between the modified version of the resource saved to the repository and the shared workspace.

7. A machine-readable storage medium storing instructions which, when executed by one or more processors, cause the one or more processors to perform the steps of claim 6.

8. The method of claim 1, further comprising the step of:
   in response to the second user making personal the shared version of the resource, storing, in the second virtual workspace, a third reference that establishes a relationship between the version of the resource that is personal to the second user and the second virtual workspace, while continuing to maintain the first reference that establishes the relationship between the shared version of the resource and the shared workspace,
   wherein storing the third reference occurs, at least in part, concurrently with storing the second reference.

9. A machine-readable storage medium storing instructions which, when executed by one or more processors, cause the one or more processors to perform the steps of claim 8.

10. The method of claim 1, wherein the entry includes information that relates (e) a resource identifier that corresponds to all versions of the resource with (f) the resource version identifier that corresponds to the personal version.

11. The method of claim 10, wherein the resource version identifier identifies a row, in a database table, in which the personal version is stored.

12. A machine-readable storage medium storing instructions which, when executed by one or more processors, cause the one or more processors to perform the steps of claim 11.

13. The method of claim 10, further comprising the steps of:
   receiving a database statement from the first user;
   determining which version of the resource is involved in the database statement, by
      determining that the database statement involves a particular row, in a database table in which one or more versions of a plurality of versions of the resource are stored, associated with a version of the resource,
      determining, based on a particular resource version identifier in the particular row, whether the first mapping includes an entry that includes the particular resource version identifier, and
      if the first mapping includes an entry that includes the particular resource version identifier, then determining that the database statement involves a personal version.

14. The method of claim 13, further comprising the step of:
determining which version of the resource is involved in the database statement, by
if the first mapping does not include an entry that includes the particular resource version identifier, then accessing a shared mapping that is associated with the shared workspace, wherein entries in the shared mapping include information that relates (g) the resource identifier that corresponds to all versions of the resource with (h) a resource version identifier that corresponds to the shared version of the resource, and
determining, from the shared mapping, the shared version of the resource that the database statement involves.

15. A machine-readable storage medium storing instructions which, when executed by one or more processors, cause the one or more processors to perform the steps of claim 14.

16. A machine-readable storage medium storing instructions which, when executed by one or more processors, cause the one or more processors to perform the steps of claim 13.

17. The method of claim 10, further comprising the steps of:
setting, in a bit vector that is associated with the first user, a particular bit that corresponds to the resource identifier that corresponds to the resource, to indicate that the first user has copied the shared version of the resource;
receiving a database statement from the first user;
determining which version of the resource is involved in the database statement, by
determining that the database statement involves a particular row, in a database table in which one or more versions of a plurality of versions of the resource are stored, that stores a version of the resource,
determining, based on a particular resource identifier in the particular row, whether the particular bit is set in the bit vector that is associated with the first user, and
if the particular bit is set in the bit vector, then determining that the database statement involves the personal version.

18. The method of claim 17, further comprising the step of:
determining which version of the resource is involved in the database statement, by
determining, from the first mapping, the resource version identifier that corresponds to the personal version, and
determining whether the particular row includes the resource version identifier that corresponds to the personal version.

19. A machine-readable storage medium storing instructions which, when executed by one or more processors, cause the one or more processors to perform the steps of claim 18.

20. A machine-readable storage medium storing instructions which, when executed by one or more processors, cause the one or more processors to perform the steps of claim 17.

21. A machine-readable storage medium storing instructions which, when executed by one or more processors, cause the one or more processors to perform the steps of claim 10.

22. The method of claim 1, wherein the first mapping is a bit vector, wherein creating an entry in the first mapping includes:
setting, in the bit vector, a particular bit that corresponds to a resource version identifier that identifies a row, in a database table, in which the personal version is stored.

23. The method of claim 22, further comprising the steps of:
receiving a database statement from the first user;
determining whether the database statement involves the version of the resource that is personal to first user, by
identifying the resource version identifier in the row of the database table, and
determining, based on the resource version identifier identified in the row, whether the particular bit is set in the bit vector.

24. A machine-readable storage medium storing instructions which, when executed by one or more processors, cause the one or more processors to perform the steps of claim 23.

25. A machine-readable storage medium storing instructions which, when executed by one or more processors, cause the one or more processors to perform the steps of claim 22.

26. A machine-readable storage medium storing instructions which, when executed by one or more processors, cause the one or more processors to perform the steps of claim 1.

27. A method performed on one or more computing devices, wherein the method involves virtual workspaces associated with users of a repository that supports versioning of a plurality of resources, the method comprising the steps of:
storing and maintaining, in a first virtual workspace, a first reference that establishes a relationship between (a) a version of a resource that is personal to a first user and (b) the first virtual workspace,
wherein the resource is one of the plurality of resources,
wherein the version of the resource that is personal to the first user is a personal version,
wherein a plurality of virtual workspaces includes the first virtual workspace and a second virtual workspace;
allowing only the first user, of a plurality of users, access to the first virtual workspace;
allowing only a second user, of the plurality of users, access to the second virtual workspace,
wherein a first mapping belongs only to the first virtual workspace,
wherein a second mapping belongs only to the second virtual workspace,
wherein the first reference corresponds to an entry, in the first mapping, that includes information that identifies a resource version identifier that corresponds to the personal version,
maintaining, for a shared workspace, a hierarchical folder structure that represents actual storage of folders in the repository without maintaining, for any virtual workspace of the plurality of virtual workspaces, a copy of the hierarchical folder structure;
in response to input from the first user, sharing the personal version, wherein sharing the personal version includes creating and storing, in the shared workspace, a second reference that establishes a relationship between (c) the personal version and (d) the shared workspace, without changing any reference in any of the plurality of virtual workspaces other than the first virtual workspace,
wherein creating and storing the second reference includes creating a particular entry in a shared mapping, wherein the particular entry includes information that identifies a resource version identifier that corresponds to the personal version.

28. A machine-readable storage medium storing instructions which, when executed by one or more processors, cause the one or more processors to perform the steps of claim 27.

* * * * *